United States Patent [19]
Després

[11] Patent Number: 4,611,700
[45] Date of Patent: Sep. 16, 1986

[54] CLUTCH RELEASE BEARING AND CORRESPONDING CLUTCH RELEASE YOKE

[75] Inventor: Dominique Després, Clichy, France

[73] Assignee: Valeo, Paris, France

[21] Appl. No.: 641,998

[22] Filed: Aug. 20, 1984

[30] Foreign Application Priority Data

Aug. 23, 1983 [FR] France .............................. 83 13587

[51] Int. Cl.[4] ............................................. F16D 23/14
[52] U.S. Cl. ................................... 192/98; 192/110 B
[58] Field of Search ............................... 192/98, 110 B

[56] References Cited
U.S. PATENT DOCUMENTS 4,466,527 8/1984 Billet ....................................... 192/98
4,529,075 7/1985 Renaud ........................ 192/70.13 X

FOREIGN PATENT DOCUMENTS 80263 6/1983 European Pat. Off. .
2513337 3/1983 France .............................. 192/110 B
2071255 9/1981 United Kingdom .

Primary Examiner—George H. Krizmanich
Attorney, Agent, or Firm—Charles E. Brown; Charles A. Brown

[57] ABSTRACT

A clutch release bearing suitable for automotive vehicles adapted to operate in traction on a clutch release device to be operated has radial arms for the corresponding clutch release yoke to operate on. With each arm there is associated an axial surface to prevent it rotating on the clutch release yoke. The axial surface thus associated with each radial arm is extended beyond the radial arm by means of a plate. The edge of the plate nearest the radial arm is formed with a chamfer in order to facilitate engagement of the clutch release yoke.

10 Claims, 7 Drawing Figures

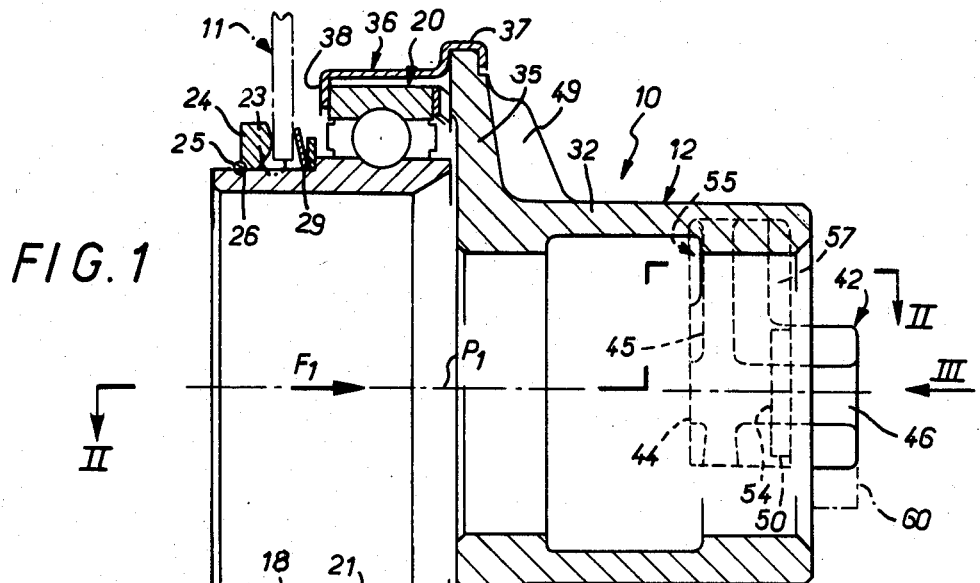
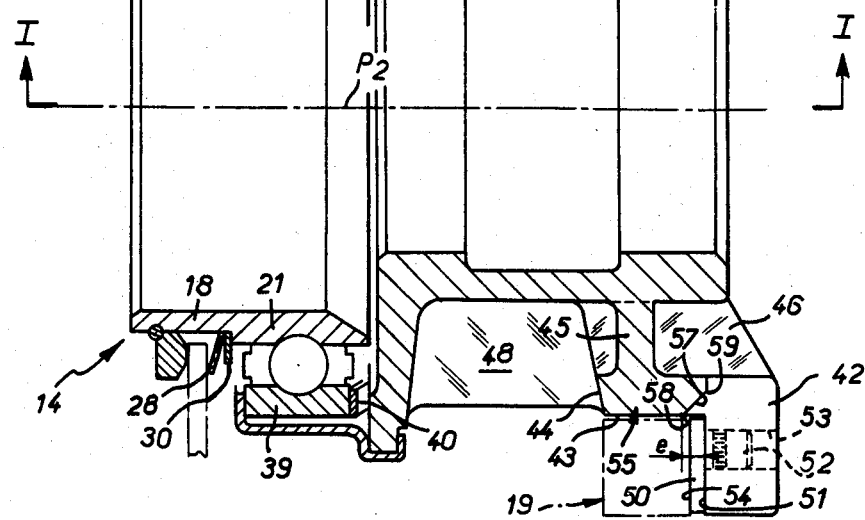

CLUTCH RELEASE BEARING AND CORRESPONDING CLUTCH RELEASE YOKE

BACKGROUND OF THE INVENTION

1. Field of the Invention

The present invention is generally concerned with clutch release bearings of the type designed to be fitted to automotive vehicles, for example, and it is more particularly directed to the case in which, in order to disengage a clutch, the clutch release bearing must operate in traction on the clutch release device which the clutch comprises for this purpose.

2. Description of the Prior Art

As is known, a clutch release bearing of this kind generally comprises a maneuvering member through the intermediary of which it is adapted to be operated on by a control member, in practice a clutch release yoke, and a drive member which is axially coupled to said maneuvering member and through the intermediary of which it is adapted to operate on the clutch release device of the clutch to be actuated, said maneuvering member comprising, for the control member to act on, two radial arms which, extending axially towards the drive member at a distance therefrom, occupy respective diametrically opposite positions relative to one another on respective opposite sides of a diametral plane of the assembly, hereinafter referred to for convenience as the engagement plane.

In practice, there is usually orthogonally associated with each of these radial arms an axial guide surface for guiding the control member and preventing the clutch release bearing rotating on the latter, parallel to the engagement plane and perpendicular to the diametral plane of the assembly passing through median parts of the radial arms, hereinafter referred to for convenience as the traction plane.

At present, the axial guide surfaces which the maneuvering member thus features, which are usually separated by a distance only very slightly smaller than that between the fingers of the clutch release yoke which in practice constitutes the control member of the clutch release bearing concerned, extend substantially equally on either side of the traction plane of the latter, like the radial arms with which they are associated.

This arrangement has given and can continue to give satisfaction.

However, problems arise in the use of clutch release bearings of this type.

Difficulties arise on fitting the assembly, that is to say during the necessary axial movement towards one another of, on the other hand, the engine block which carries the clutch and thus, through the intermediary of the latter, the clutch release bearing and, on the other hand, the gearbox on the housing of which the clutch release yoke is pivotally mounted.

It is then necessary to engage the clutch release yoke on the maneuvering member of the clutch release bearing, between the radial arms of the latter, which are in practice disposed at its end, and its main part.

It is therefore necessary to associate with the axial movement towards one another of the engine block and the gearbox a pivoting movement for the clutch release yoke enabling it, initially offered up flat, parallel to the axis of the assembly so as to pass beyond the radial arms of the clutch release bearing, to become progressively hooked over the latter transversely to said axis.

As will be readily understood, if during this operation the clutch release bearing is not offered up to the clutch release yoke with the proper angular orientation relative to the axis of the assembly, the axial surfaces associated with its radial arms, by virtue of the distance between them, oppose the proper engagement of the clutch release yoke, the edges of the fingers of the latter then striking against these axial surfaces. It is then necessary to reverse the relative axial movement of the engine and the gearbox, and in practice this is after they have been fastened together, involving the removal of the retaining bolts.

To overcome this difficulty, it is proposed in UK Patent Application No. 2 071 255 to confer a polygonal transverse cross-section on the main part of the maneuvering member of the clutch release bearing.

Conjointly with this, however, the fingers of the clutch release yoke must be of different length so as to come in turn into contact with the aforementioned main part when the clutch release yoke is engaged on it, the first of these fingers which comes into contact with this main part rotating it around the axis of the assembly so as to confer on it the correct angular position relative to the second.

Given this rotation, the radial arms of the maneuvering member of the clutch release bearing on which the fingers of the clutch release yoke are adapted to operate must then be of relatively large extent in the circumferential direction and, in practice, they constitute non-separate parts of a common circumferentially continuous radial flange, which is prejudicial to the weight of the assembly. Moreover, an arrangement of this kind is suitable only for release bearings of which the overall dimensions, particularly in the axial direction, are sufficient for the longer arm not to encounter any obstacle, in particular on pivoting of the yoke after passing beyond the radial arms at the assembly stage.

A general objective of the present invention is an arrangement providing a very simple means of overcoming these difficulties, whilst also avoiding the disadvantages outlined hereinabove.

SUMMARY OF THE INVENTION

In one aspect, the present invention consists in a clutch release bearing suitable for automotive vehicles comprising a drive member adapted to operate on a clutch release device of a clutch, a maneuvering member axially coupled to said drive member and comprising two radial arms adapted to be operated on by a control member, in practice a clutch release yoke, in diametrally opposite positions and on respective opposite sides of a diametral plane of the assembly hereinafter referred to as the engagement plane, said arms being spaced from and extending axially towards said drive member, a respective first axial surface associated orthogonally with each of said arms adapted to guide said control member and to prevent said clutch release bearing rotating on said control member, a respective plate associated with each of said arms on said maneuvering member, said plates being on the same side of a diametral plane of the assembly, hereinafter referred to as the traction plane, perpendicular to said engagement plane and passing through median parts of said arms, a respective second axial surface on each of said plates, and a chamfer on an edge of each of said plates perpendicular to said traction plane and nearest the associated radial arm.

In this way the engagement of the clutch release yoke on the clutch release bearing is advantageously facilitated, in spite of the presence of an obstacle on the axial movement towards one another of the engine block and the gearbox, at the cost of a slight increase in the amount of material used. By virtue of the chamfer, and given the extent of the second axial surface, the plates of the release bearing and thus said surfaces, initially offered up parallel to the internal surfaces of the fingers of the clutch release yoke, are laterally guided towards said internal surfaces of the fingers of the yoke even if they are not in the precise orientation required relative to the latter.

Chamfers of the same type are preferably provided on the clutch release yoke also.

Thus in a second aspect, the present invention consists in a clutch release yoke comprising two fingers adapted to bear on radial arms of a clutch release bearing suitable for automotive vehicles comprising a drive member adapted to operate on a clutch release device of a clutch, a maneuvering member axially coupled to said drive member and comprising two radial arms adapted to be operated on by a control member, in practice a clutch release yoke, in diametrally opposite positions and on respective opposite sides of a diametral plane of the assembly hereinafter referred to as the engagement plane, said arms being spaced from and extending axially towards said drive member, a respective first axial surface associated orthogonally with each of said arms adapted to guide said control member and to prevent said clutch release bearing rotating on said control member, a respective plate associated with each of said arms on said maneuvering member, said plates being on the same side of a diametral plane of the assembly, hereinafter referred to as the traction plane, perpendicular to said engagement plane and passing through median parts of said arms, a respective second axial surface on each of said plates, and a chamfer on an edge of each of said plates perpendicular to said traction plane and nearest the associated radial arm, wherein said fingers each comprise a chamber on an edge thereof transversely facing the corresponding edge of the other finger.

In a first embodiment, each of the first axial surfaces constitutes an extension of the respective second axial surface.

It will be noted that this embodiment makes it possible to limit the risk of incrustation of the fingers of the clutch release yoke in the first axial surfaces of the release bearing.

As the prior art first axial surfaces are of relatively limited extent, it is relatively common to encounter rapid deterioration of these axial surfaces in service, because of the rotational drive force relative to the axis of the assembly to which the clutch release bearing is subjected, this corresponding to incrustation of the fingers of the clutch release yoke in these surfaces, prejudicing its freedom to pivot relative to the clutch release bearing.

This phenomenon of rotational entrainment is more pronounced if the arms of the yoke carrying the fingers are subjected to bending, especially when said yoke is mounted on a shaft and more particularly on half-shafts. By virtue of the increased extent in accordance with the invention of the first axial surfaces this risk of incrustation is reduced.

In a second embodiment, the first and second axial surfaces are separate from and parallel to one another.

In practice, the second axial surfaces are separated by a distance less than that separating the first axial surfaces.

In this manner, assembly is greatly facilitated.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 1 is a view in axial cross-section on the line I—I in FIG. 2 of a clutch release bearing in accordance with the invention.

FIG. 2 is another view of it in axial cross-section on the broken line II—II in FIG. 1.

DESCRIPTION OF THE PREFERRED EMBODIMENTS

Figure 3:
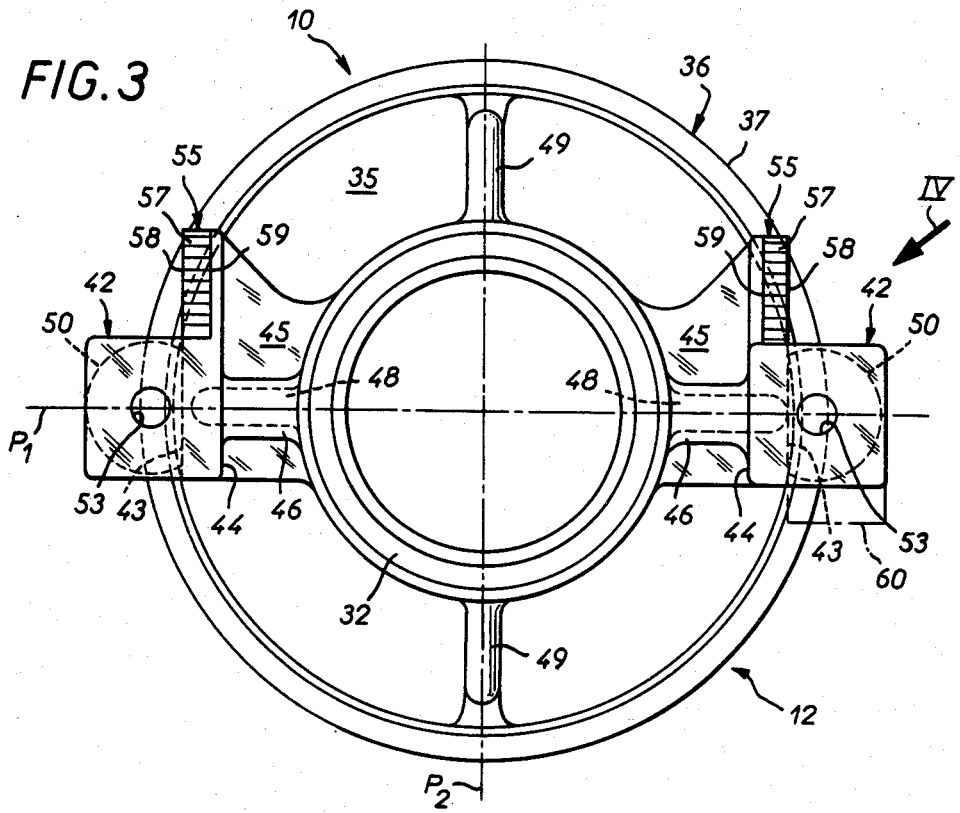
FIG. 3 is an end-on view of it as seen in the direction of the arrow III in FIG. 1.
Figure 4:
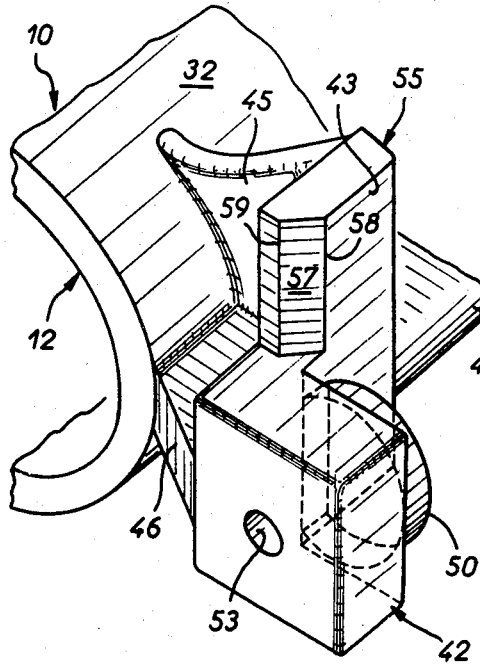
FIG. 4 is a partial view of it in perspective in the approximate direction of the arrow IV in FIG. 3.

As shown in the figures, and as is best seen in FIG. 1, the overall objective is to couple a clutch release bearing 10 to the clutch release device 11 of a clutch in at least one axial direction corresponding to the exertion of traction on said clutch release device 11 by said clutch release bearing 10, as represented schematically by the arrow F1 in FIG. 1.

Overall, in a manner known per se, the clutch release device 10 comprises, on the one hand, a maneuvering member through the intermediary of which it is adapted to be operated on by a control member, in practice a clutch release yoke 13 (FIGS. 5 and 6) and, on the other hand, a drive member 14 which is axially coupled to said maneuvering member 12 and through the intermediary of which it is adapted to operate on the clutch release device 11.

As it is not of itself relevant to the present invention, the clutch release device will not be described here.

For this reason it is shown only schematically in chain-dotted line in the figures.

It is sufficient to indicate that, in the embodiments shown, it consists of the central part, subdivided into radial fingers by slots, of an annular member usually called the diaphragm spring.

The clutch release yoke 13 is, as is usual, pivotally mounted in the embodiments shown on pivot pins 16 on the housing 17 of the associated gearbox and, for the purpose of operating on the clutch release bearing 10, it features two fingers 19 (FIGS. 5 and 6) of which the inside surfaces facing one another are seen at 63.

In the embodiment shown, the drive member 14 of the clutch release bearing 10 essentially consists of a ball bearing 20 of which the inner race 21, extended in the axial direction for this purpose to constitute a bush 18, passes through the clutch release device 11, by means of a central opening 23 in the latter.

Beyond the clutch release device 11 an annular member 24, usually referred to as the gripping member, bears axially on the clutch release device 11, on the side thereof opposite the clutch release bearing 10, bearing for this purpose on an elastic ring 25, such as a split elastic ring, for example, engaged radially in a groove 26 in the bush 18 of the drive member 14.

On the side of the clutch release device 11 facing the clutch release bearing 10 an axially acting elastic washer 28, such as a simple Belleville washer, for example, also bears axially on the clutch release device 11, bearing also on a shoulder 29 on the bush 18 through the intermediary of a distributor washer 30, in order to maintain the gripping member 24 in contact with the clutch release device 11 and with the elastic ring 25.

Figure 5:
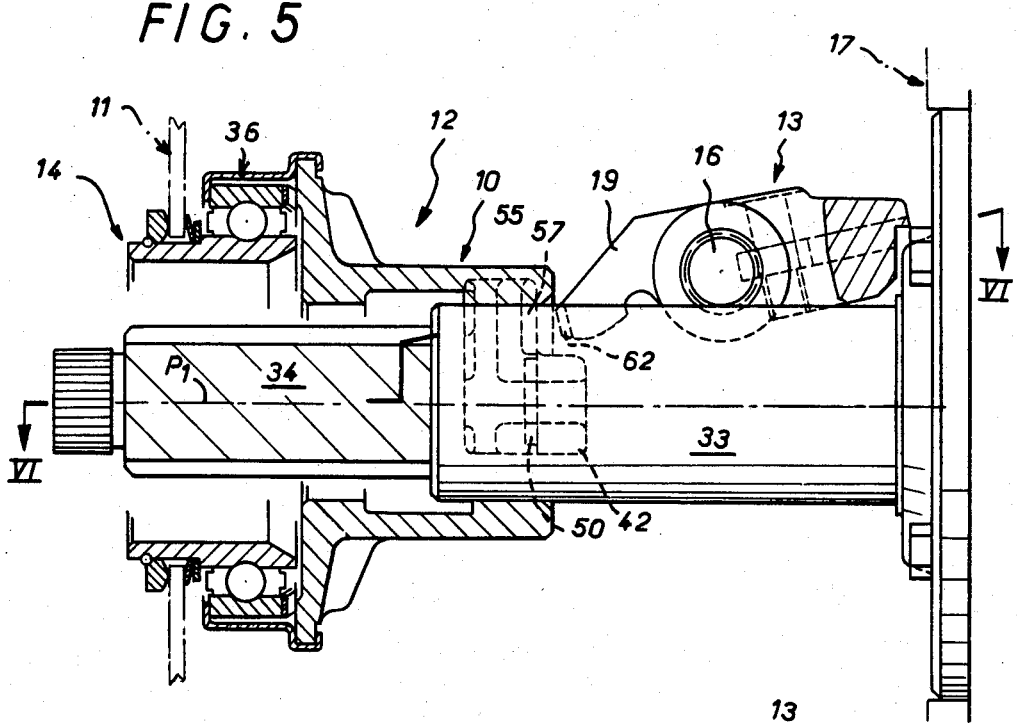
FIGS. 5 and 6 respectively correspond to FIGS. 1 and 2 on a smaller scale and show the engagement on the clutch release bearing of a clutch release yoke in accordance with the invention.
Figure 6:
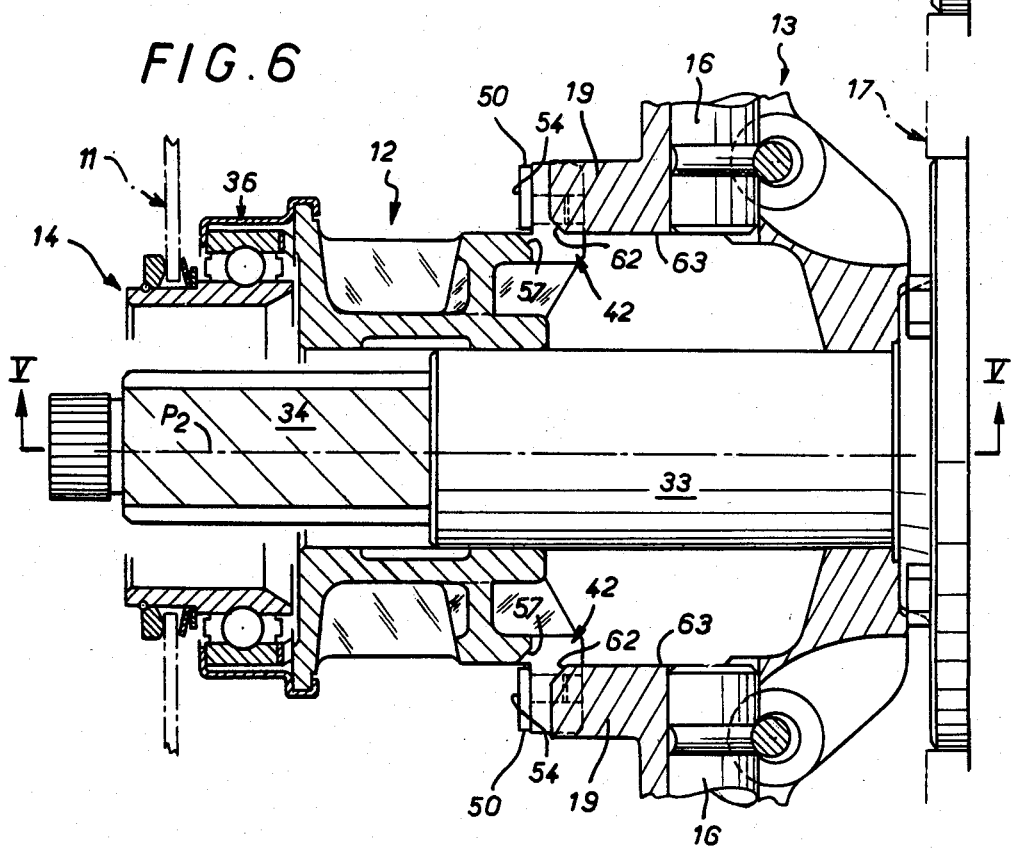

In the embodiment shown, the maneuvering member 12 of the clutch release bearing 10 comprises an axial sleeve 32 adapted for its sliding engagement on a guide member 33 of any suitable kind, in practice the "trumpet" which the housing 17 of the associated gearbox usually comprises, around the input shaft 34 of the latter (FIGS. 5 and 6).

At the axial end of the sleeve 32 nearest the drive member 14, the maneuvering member 12 of the clutch release bearing 10 comprises a transverse flange 35 and in the embodiment shown said drive member 14 is axially coupled to this flange 35 by an annular cover 36 which is on the one hand crimped at 37 to the edge of said flange 35 at one axial end and, on the other hand, has at its opposite axial end an upstanding edge 38 extending radially towards the axis of the assembly in order to define, with said flange 35, an annular cage within which is axially retained the outer race 39 of the ball bearing 20 constituting the drive member 14.

As the clutch release bearing is of the self-centering type, predetermined annular clearance is provided between, on the one hand, the drive member 14 and, on the other hand, the cover 36 coupling it axially to the flange 35 of the maneuvering member 12.

As the self-centering clutch release bearing is more precisely of the kind in which the self-centering action is maintained, axially acting elastic means are deployed between the drive member 14 and the maneuvering member 12.

These consist, for example and as shown here, of a corrugated elastic washer 40 of the type marketed under the trade name "ONDUFLEX" and which, inserted axially between the flange 35 of the maneuvering member 12 and the corresponding edge of the outer race 39 of the ball bearing constituting the drive member 14, continuously urges this outer race 39 into bearing engagement at its opposite edge with the upstanding edge 38 of the annular cover 36.

These arrangements are well known per se and as they are not of themselves the object of the present invention they will not be described in more detail here.

Likewise, in a manner known per se, the maneuvering member 12 of the clutch release bearing 10 comprises, transversely, at the end of the sleeve 32 opposite the drive member 14, two radial arms 42 on which the clutch release yoke 13 operates, extending at a distance from said drive member 14 and axially directed towards it, being disposed in respective diametrally opposite positions relative to one another and on respective opposite sides of a diametral plane P2 of the assembly, hereinafter referred to for convenience as the engagement plane.

This plane P2 is indicated in chain-dotted line in FIGS. 2, 3 and 6.

In a manner also known per se, there is orthogonally associated with each of these radial arms 42 an axial guide surface 43 adapted to guide the control yoke 13 and to prevent the clutch release bearing 10 rotating on the latter, parallel to the engagement plane P2 of the assembly and perpendicular to the plane of the assembly passing through median areas of the radial arms 42, hereinafter referred to for convenience as the traction plane P1.

This traction plane P1 is indicated in chain-dotted line in FIGS. 1, 3 and 5.

In practice, in the embodiment shown, the radial arms 42 project outwardly from bosses 44 which are radially spaced from the sleeve 32, being linked to the latter by an array of cruciform ribs 45, 46, and on which the axial surfaces 43 are formed.

Each of the resulting combinations of a radial arm 42 and a boss 44 is also linked to the flange 35 and to the sleeve 16 by a rib 48 in the traction plane P1 and, in cruciform relationship with these ribs 48, said flange 35 is also linked in isolation to said sleeve 32 by ribs 49 in this example, in the engagement plane P2.

In the embodiment shown, the radial arms 42 are of rectangular contour in elevation and on the side facing the drive member 14, that is to say on that of their surfaces on which the corresponding finger 19 of the clutch release yoke 13 is adapted to bear, as represented schematically in chain-dotted line in FIG. 2, there is attached a pad 50 of an appropriately treated material for this finger 19 to act on and thus to protect it from its action.

The contour of a pad 50 of this kind is in practice a circle truncated by a flat. The pad 50 is, for example, attached to the radial arm 42 concerned by a peg 52 integral with or attached to it and which is force-fitted into a hole 53 provided for this purpose in the radial arm 42.

As will be readily understood, the free surface 54 of the pads 50 constitutes the active surface of the radial arms 42 to which they are fitted in relation to the fingers 19 of the clutch release yoke 13, that is to say the surfaces of the radial arms 42 on which said fingers 19 of the clutch release yoke 13 actually operate, and its other surface bears against the surface 51 of the radial arm 42 facing the drive member, hereinafter referred to for convenience as the application surface.

In accordance with the invention, an axial surface is provided beyond each radial arm 42 parallel to the engagement plane P2 by virtue of a plate 55 provided for this purpose on the maneuvering member 12, on the same side of the traction plane P1 for each of said radial arms.

Said axial surface constitutes an extension of the axial guide surface 43, being coplanar with it, so that the axial guide surface 43 associated with each of the radial arms 42 is extended beyond the radial arm 42 parallel to the engagement plane P2, by virtue of the protruding plate 55 provided for this purpose on the maneuvering member 12 which, on the same side of the traction plane P1 for each of said radial arms 42, itself extends the corresponding boss 44. The associated rib 45 is also, in practice, extended in consequence of this, as far as the free edge of said plate 55.

Further in accordance with the invention, and in combination with the preceding arrangement, that of the edges of each of the plates 55 which is perpendicular to the traction plane P1 and nearest the associated radial arm 42 is formed with a chamfer 57.

In practice, because of machining considerations and in particular to facilitate the milling of the surface 43, as the chamfer 57 extends between two lines, in this instance the edges 58 and 59, perpendicular to the traction plane P1, that axially nearest the drive member 14, in this instance the edge 58, is in the transverse direction at least level with the application surface 51 of the corresponding radial arm.

For preference and as shown here, it is axially nearer the drive member 14 than this application surface 51.

In other words, for preference and as shown here, there is an axial distance e (FIG. 2) between the application surface 51 as defined hereinabove of a radial arm 42, on the one hand, and the relevant edge 58 of the corresponding plate 55, on the other hand, in the direction towards the drive member 14 from said application surface 51.

For preference also, and as schematically represented in chain-dotted lines in FIGS. 1 and 3, at least one of the radial arms 42 carries a polarizer peg 60 projecting relative to the traction plane P1 on the side opposite the associated plate 55, constituting an extension of the radial arm 42.

Conjointly, and as shown here, the inside edges of the ends of the fingers 19 of the clutch release yoke 13, that is to say the edges which face one another transversely, are each formed with a chamber 62, which is preferably complementary to that 57 featured by the plates 55 associated with the radial arms 42 of the clutch release bearing 10.

As will be readily understood, as a result of what has been described, and more precisely because of the chamfers 57 and 62, when the gearbox carrying the clutch release yoke 13 and the engine block carrying the clutch release bearing 10 are moved axially towards one another, the engagement of the clutch release yoke 13 on the maneuvering member 12 of the clutch release bearing 10 after passing beyond the radial arm 42 of the latter is facilitated.

As a matter of fact, because of these chamfers, and given in particular the extent as specified hereinabove of the chamfers 57 on the plates 55, the guide surfaces 43 initially offered up substantially parallel to the internal surfaces 63 of the clutch release yoke (FIGS. 5 and 6) are naturally guided towards the surfaces 63 even if they are not offered up exactly parallel to said surfaces 63.

The clutch release yoke may then without difficulty be tilted transversely, that is to say substantially perpendicularly to the axis of the assembly, so as to occupy its final position in contact with the active surface 54 of the radial arms 42.

Moreover, since the plates 55 provided in accordance with the invention increase the extent of the axial surfaces 43, there is no risk of any incrustation of the fingers 19 of this clutch release yoke 13 in these axial surfaces 43 in service.

As will be readily understood, the polarizer 60 prevents any attempted engagement from the opposite side to the chamfer 57, and thus ensures that engagement is effected only from the side of the chamfer 57, benefitting from the latter.

As an alternative, each axial surface 43 is extended beyond the radial arm 42 over part only of the plate 55.

Figure 7:
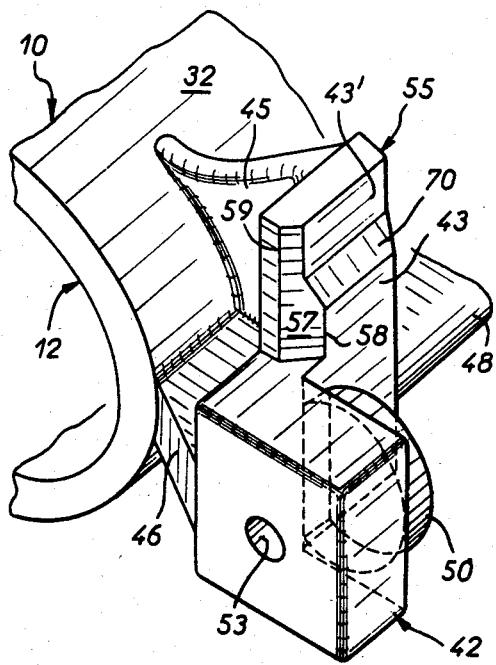
FIG. 7 is a view analogous to FIG. 4 of another embodiment.

As is visible in FIG. 7, an axial surface 43' referred to hereinafter for convenience as the mounting surface, parallel to the engagement plane P2 and the axial surface 43, is provided on said plates 55. In practice, this mounting surface 43' is nearer the sleeve 32 than the axial surface 43 so that said mounting surfaces 43' are separated by a distance which is less than that separating the surfaces 43, and thus the fingers 19 of the yoke. In this way clearance is provided between each surface 43' and the corresponding finger 19 of the yoke, which further facilitates the engagement of the clutch release yoke on the clutch release bearing. It will be noted that the mounting surface 43' is linked to the axial surface 43 by a chamfer 70, referred to hereinafter for convenience as the mounting chamfer. By virtue of this chamfer 70, the fingers of the clutch release yoke, initially engaged on the mounting surfaces 43' by virtue of the chamfers 57, may be readily tilted at a subsequent stage, passing from the mounting surface 43' to the axial surface 43 via the chamfer 70, into their final position. It will be appreciated that all these shapes may be easily obtained using casting technology.

It will be understood that various changes in the details, materials and arrangement of parts which have been herein described and illustrated in order to explain the nature of the invention may be made by those skilled in the art within the principle and scope of the invention as expressed in the appended claims.

For example, the axial surface 43 need not be extended beyond the radial arm 42, in which case only the mounting surface 43' and the chamfer 70 are provided on the plate 55.

Likewise, the chamfers on the yoke and on the plate might be replaced with rounded surfaces, the term "chamfer" in the context of the present invention being understood to encompass this possibility.

Moreover, although favoring its engagement, the chamfers on the clutch release yoke may not be needed, those provided on the clutch release bearing being more than sufficient more often then not, especially when the plate comprises a mounting surface. It will be appreciated that in such cases the clutch release bearing in accordance with the invention may be mounted as a replacement part in existing automotive vehicles.

I claim:

1. Clutch release bearing suitable for automotive vehicles, said clutch release bearing comprising a drive member adapted to operate on a clutch release device of a clutch, a maneuvering member axially coupled to said drive member and comprising two radial arms adapted to be operated on by a control member in diametrally opposite positions and on respective opposite sides of an engagement plane, said arms being spaced from the extending axially towards said drive member, a respective first axial surface associated orthogonally with each of said arms forming means for guiding a control member and to prevent said clutch release bearing from rotating on such control member, a respective plate associated with each of said arms on said maneuvering member, said plates being on the same side of a traction plate, perpendicular to said engagement plane and passing through median parts of said arms, a respective second axial surface on each of said plates, and a chamfer on an edge of each of said plates perpendicular to said traction plane and nearest the associated radial arm.

2. Clutch release bearing according to claim 1, wherein each of said first axial surfaces constitutes an extension of the respective second axial surface.

3. Clutch release bearing according to claim 1, wherein said first and second axial surfaces are separate from and parallel to one another.

4. Clutch release bearing according to claim 3, wherein said second axial surfaces are separated by a distance less than that separating said first axial surfaces.

5. Clutch release bearing according to claim 4, wherein each of said plates incorporates a third axial surface which is an extension of said first axial surface.

6. Clutch release bearing according to claim 5, further comprising a respective chamfer linking each of said first axial surfaces to the associated second axial surface.

7. Clutch release bearing according to claim 1, wherein said chamfer on each of said plates intersects said first axial surface along a line which is nearer said drive member than the surface on which the corresponding radial arm is adapted to bear.

8. Clutch release bearing according to claim 1, wherein at least one of said arms comprises a projecting polarizer peg constituting an extension of said arm on the side of said traction plane opposite the associated plate.

9. Clutch release yoke and clutch release bearing assembly, said clutch release yoke comprising two fingers adapted to bear on radial arms of a clutch release bearing suitable for automotive vehicles, and said clutch release bearing comprising a drive member adapted to operate on a clutch release device of a clutch, a maneuvering member axially coupled to said drive member and comprising two radial arms adapted to be operated on by said clutch release yoke, in diametrally opposite positions and on respective opposite sides of an engagement plane, said arms being spaced from the extending axially towards said drive member, a respective first axial surface associated orthogonally with each of said arms forming means for guiding said clutch release yoke and to prevent said clutch release bearing from rotating on said clutch release yoke, a respective plate associated with each of said arms on said maneuvering member, said plates being on the same side of a traction plane, perpendicular to said engagement plane and passing through median parts of said arms, a respective second axial surface on each of said plates, and a chamfer on an edge of each of said plates perpendicular to said traction plane and nearest the associated radial arm, wherein said fingers each comprise a chamfer on an edge thereof transversely facing the corresponding edge of the other finger.

10. Clutch release yoke and clutch release bearing assembly according to claim 9, wherein said chamfers on said fingers are complementary to said chamfers on said plates of said clutch release bearing.

* * * * *